March 4, 1941.  H. L. HULL  2,233,415
POSITION CONTROL SYSTEM
Filed June 17, 1937  3 Sheets-Sheet 1
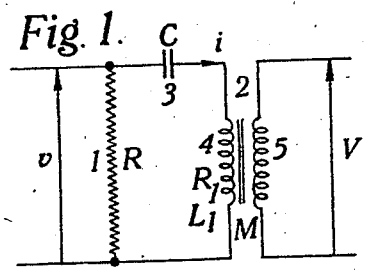
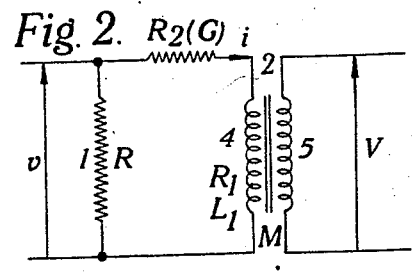
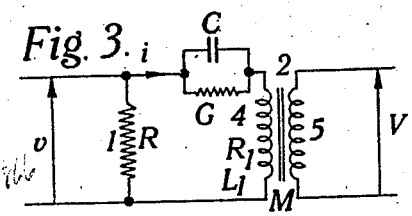
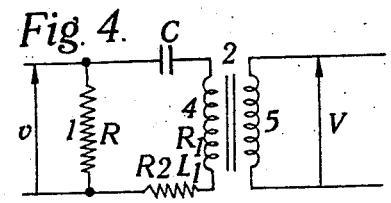
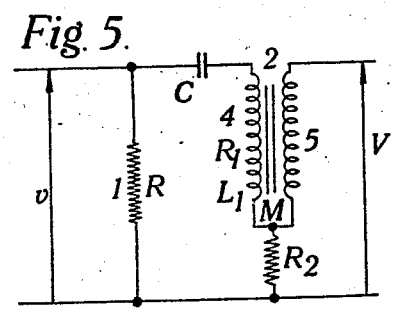
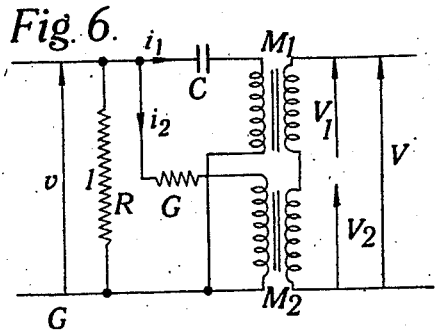
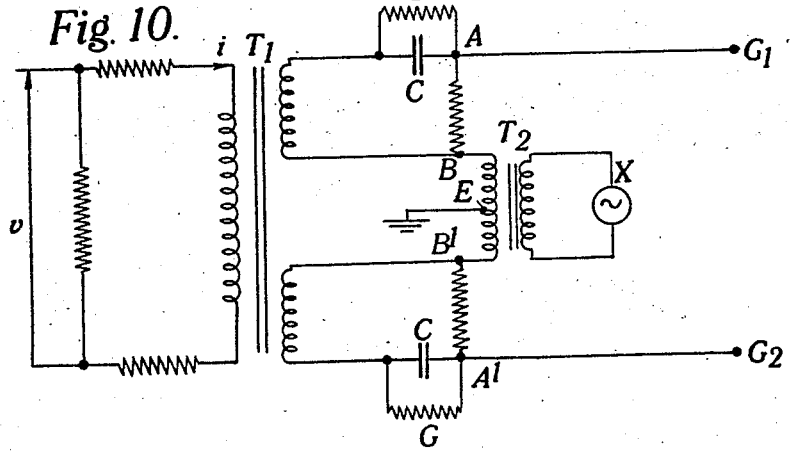
INVENTOR
HARVARD L. HULL
By Herbert H. Thompson
HIS ATTORNEY

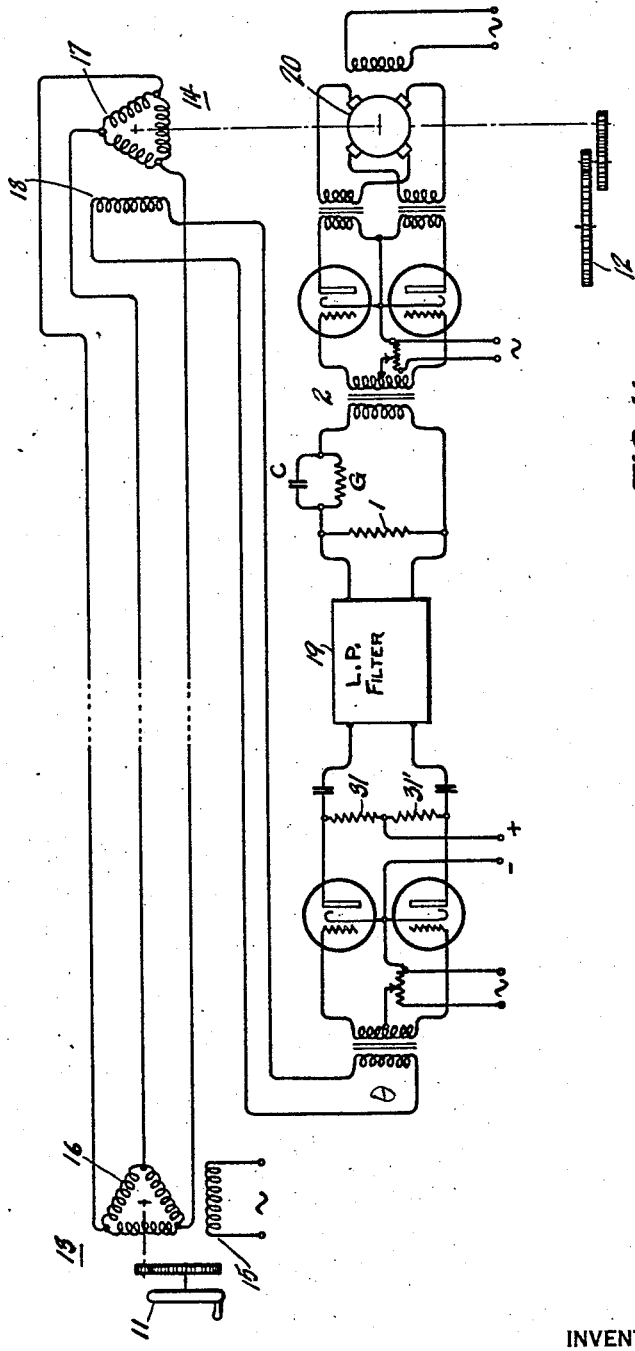

Patented Mar. 4, 1941

2,233,415

UNITED STATES PATENT OFFICE 2,233,415

POSITION CONTROL SYSTEM

Harvard L. Hull, Leonia, N. J., assignor to Sperry Gyroscope Company, Inc., Brooklyn, N. Y., a corporation of New York Application June 17, 1937, Serial No. 148,653
In Great Britain June 20, 1936

10 Claims. (Cl. 172—239)

This invention relates to position control systems and is an improvement in or modification of the control system described in Patent No. 2,088,654. This patent relates to position control systems in which a controlling object controls a controlled object in accordance with the lag $\theta$ of the controlled object in following and with the second derivative $\ddot{\theta}$ of this lag: In accordance with the invention of the aforesaid application amplifiers are used which add to the lag terms, obtained from a lag measuring device, second derivative terms generated during the passage of signals representing the lag terms through the amplifier.

According to the present invention the first derivative terms in $\dot{\theta}$ are added to the previously used terms $\theta$ and $\ddot{\theta}$. The $\dot{\theta}$ terms are the most important for obtaining close following, because they assist in imparting initial accelerations, and because inertia forces are generally greater than frictional or damping forces. However, it is found that the use of the $\dot{\theta}$ terms increase damping so that the tendency of the system to hunt is avoided.

The use of the first and second derivatives are hereinafter described in connection with a control system for a follow-up, or position-control, servo motor, the system being such that the voltage $v$ measures the lag $\theta$ of the follow-up member. The voltage $V$ obtained in accordance with the principles of our invention then includes components proportional to terms in $\dot{\theta}$ and $\ddot{\theta}$.

A further feature of the invention resides in modifications of the circuits of the amplifier shown in the aforesaid co-pending Patent No. 2,088,654 so that the amplifier generates the desired mixture of first and second derivatives, and adds them to the signals representing the lag, as these pass through the amplifier.

A further feature of the invention is the provision of an amplifier that will generate first and second derivatives and combine them in opposite senses.

In the application of the invention to follow-up systems, it is necessary first to obtain a D. C. voltage or D. C. current whose magnitude and sense is a measure of the lag of the controlled object in following the controlling object. Various methods of achieving this result are well known: they form no part of the present invention. One such method is described in the aforesaid co-pending Patent No. 2,088,654. In accordance with the system illustrated in Figure 1 of the drawings accompanying the said patent a quasi D. C. voltage is produced across a resistance 31, 31'. This voltage varies in magnitude and sense with the lag in following, but has A. C. voltage superimposed on it. A filter is therefore employed and the output of this filter is substantially a quasi D. C. voltage proportional in magnitude and sense to the lag in following. For the purposes of the present invention it is unimportant how the voltage is obtained, nor does it matter what is the impedance across which the voltage is developed, provided that the magnitude of the impedance is not too high.

The circuit arrangements according to the invention are diagrammatically illustrated by way of example in the accompanying drawings in which:

Figure 1 illustrates the general principle used in the co-pending Patent No. 2,088,654 hereinbefore referred to for obtaining the second derivative $\ddot{\theta}$.

Figure 2 illustrates the general principle used to obtain the first derivative $\dot{\theta}$.

Figure 3 illustrates one form of a circuit according to the invention in which both the second and first derivatives are obtained.

Figures 4, 5, 6 and 7 show modifications of the invention.

Figure 9 shows another modification of the circuit according to the invention and Figure 10 shows a modification of the circuit illustrated in Figure 9.

Fig. 11 is a simplified diagram of the circuit of a position control system similar to that described in Patent No. 2,088,654, which includes one form of the differentiating circuits of the present invention.

Figure 7:
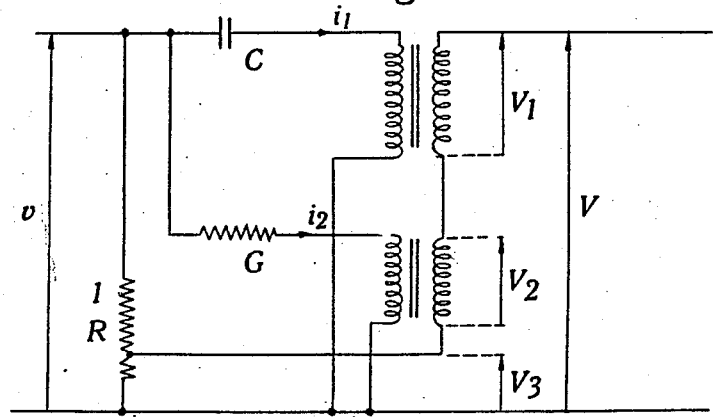

It is assumed in all the embodiments of the invention hereinafter described that a voltage $v$ is maintained by means not shown across a resistance. The resistance, such as 1, may be considered as corresponding to resistance 31, 31' of Patent No. 2,088,654, or to the terminating impedance of filter 37 of the said application.

In the circuit arrangement according to the co-pending Patent No. 2,088,654 as illustrated in Figure 1 of the present application a transformer 2 and a condenser 3 are employed. The primary winding 4 of transformer 2 is connected in series with a condenser 3 across the resistance or impedance 1. If the circuit constants are suitably chosen, this arrangement will produce a voltage output V from the secondary winding 5 of transformer 2 which is substantially proportional to $$\frac{d^2v}{dt^2}$$

Suppose that the values of the resistance and inductance of the primary winding 4 are denoted respectively by $R_1$ and $L_1$ and the capacity of condenser 3 by C, and that the resistance 1 is R ohms. Assuming the secondary current drawn from winding 5 of transformer 2 to be negligible, as, for example, when this transformer is feeding the grids of electron discharge tubes and assuming the primary current of the transformer to be represented by $i$, then $v$ is given by the following equation:

$$v = \frac{1}{C}\int i\,dt + R_1 i + L_1 \frac{di}{dt}$$

The three terms on the right hand side of the equation represent the voltage drops across the condenser 3 and primary winding 4. The relative magnitudes of these three voltages will depend on the rate of change of $i$, and this will depend on the rate of change of $v$. $v$ in turn depends on the lag in following of the follow-up system and this will depend partly on the kinds of motion that are being followed and partly on the mechanical constants of the follow-up system. In practical applications we have found that the rates of change that enter into practical follow-up systems are slow and correspond to oscillations at low frequencies of the order of between 5 per second and ⅕ per second.

Frequencies outside this range may be ignored: higher frequencies of oscillation can hardly occur in practical systems as motions to be followed, and motions of lower frequencies can be so easily followed that lags are small, so that the components of low frequency present in the voltage $v$ are very small. In special cases the frequencies of importance may be different; the principle of the invention would still be applicable using different values of the constants.

Between the above mentioned frequencies, or whatever frequencies are important, or at the rates of change that correspond to them, the constants C, $R_1$ and $L_1$ may be so chosen that the voltage drop across the resistance $R_1$ and inductance $L_1$ of the primary winding 4 of transformer 2 is negligible compared with the voltage drop across the condenser 3. For example the former voltage may be made less than ⅒ of the latter.

If this condition is satisfied the voltage across condenser 3 is substantially equal to $v$ and the current $i$ into this condenser is given approximately by the equation $$i = C\frac{dv}{dt}$$

or $$CDv$$

where D represents the differential operator $$\frac{d}{dt}$$

To bring about this result the impedance of the condenser at frequencies of the order of 5 per sec. to ⅕ per sec. must be high compared with the impedance due to resistance $R_1$ and inductance $L_1$ of the primary winding 4 at these frequencies. It is generally advisable also to have the resistance 1 considerably lower than the impedance of the condenser at the same frequencies, otherwise the current $i$ is an appreciable fraction of the total current drawn by the whole circuit of Figure 1 from the source that maintains the voltage $v$, and this may modify the action of this source and consequently the value of the voltage $v$ measuring the lag in following.

Provided the above conditions are satisfied the result is obtained that $i$ is substantially equal to $CDv$. The output voltage V of the secondary winding of transformer 2 is equal to $-MDi$ where M is the mutual inductance of the two windings.

Consequently $V = -MCD^2v$, where $D^2$ represents the differential operator $$\frac{d^2}{dt^2}$$

i. e. the output voltage is the second derivative of $v$.

Figure 2 differs from Fig. 1 in that a resistance $R_2$ replaces the condenser C. Here again, if $R_2$, or $R_2$ plus $R_1$ is considerably greater than the impedance of $L_1$ at the frequencies of importance, the voltage drop due to $L_1$ will be negligible and $i$ will be determined by the resistance $R_2$ only, or by $R_1 + R_2$. Consequently $i$ will be proportional to $v$. In fact if G is substituted for $$\frac{1}{R_2}$$

(or for $$\frac{1}{R_1 + R_2}$$

if $R_1$ is not negligible) the result is that $i = Gv$. The output voltage V is therefore $-MGDv$, i. e. it is the first derivative of $v$.

The object of the invention is to combine the results of Figs. 1 and 2.

Fig. 3 shows one form of the invention. In this the condenser 3 of Fig. 1 and the resistance $R_2$ of Fig. 2 have been replaced by a condenser C in parallel with a conductance G. As before, the impedance of this combination at the frequencies of importance is arranged to be high compared with that of the primary winding 4 of transformer 2. In other words, in practical conditions of operation, the voltages developed across the primary 4 are to be only a small fraction of those developed across C and G in parallel, though clearly this fraction cannot be made too small without V also becoming too small.

These conditions require that the impedance of C and that of G shall each separately be high compared with that of the primary winding 4. When the conditions are satisfied, the voltage across C and G will substantially be equal to $v$, and the current $i$ passed by the combination will be $CDv + Gv$, since $CDv$ is substantially the current passed by C and $Gv$ is substantially that passed by G.

As before $V = -MDi$
so that $V = -(MCD^2v + MGDv)$ i. e. V contains terms in the first and second derivatives of $v$ with respect to time. Moreover these terms are separately and independently variable by varying G and C. This feature is very useful in making adjustments for experimental or other purposes.

Fig. 3 may be regarded as being derived from Figs. 1 and 2 by putting C and $R_2$ in parallel. Fig. 4 is derived from them by putting C and $R_2$ in series. Since the two limiting cases of Fig. 4 when the impedance of C is very much greater than $R_2$, and when it is very much less, reduce to figures, 1 and 2 respectively, i. e. to the use of second and to the use of first derivatives, it follows from general physical reasoning that intermediate cases should behave in an intermediate manner, and give results analogous to the use of first and second derivatives together.

It is clear also that $R_2$ need not be additional to $R_1$. The existence of any resistance in the primary circuit of the transformer, whether in the transformer winding or outside, will give the required results if this resistance is appreciable compared to the impedance of C. Such values of the primary resistance distinguish the form of the present invention shown in Fig. 4 from Patent 2,088,654.

Fig. 5 shows another form of our invention. In this form the impedance of C is again the predominant one, so that the primary current is $CDv$. The voltage V applied to the output circuit is now made up of the output of the winding 5 and of the voltage across the resistance $R_2$ which is common to both the primary and the secondary circuits. Clearly therefore $$V = -MCD^2v + R_2CDv$$

It is therefore made up of first and second derivatives. Incidentally it may be noted that these two terms are additive or opposed according to the sign of M. Either result may be obtained at will according as the connections are made to the primary or to the secondary winding of the transformer.

Fig. 6 shows another form of the invention. This differs from Fig. 3 in that the currents through C and G feed the primaries of different transformers instead of both feeding the same transformer. If $M_1$, $M_2$ are the mutual inductances of the two transformers, $i_1$, $i_2$ their primary currents, and $V_1$ and $V_2$ their secondary output voltages, then, as in Fig. 1.

$$V_1 = -M_1Di_1 = -M_1CD^2v$$

and, as in Fig. 2.

$$V_2 = -M_1Di_2 = -M_2GDv$$

It follows that the total output voltage V which is equal to $V_1 + V_2$ is given by $$V = -(M_1CD^2v + M_2GDv)$$

Thus it contains first and second derivatives. In this form of the invention the relative magnitudes and signs of the first and second derivative terms can be readily and independently adjusted. The magnitudes can be varied by varying C or G and the signs can be adjusted by reversing the primary or secondary connections to the appropriate transformers.

Clearly, in any of the circuits shown, the transformers may be replaced by auto-transformers.

In Patent 2,088,654 is described how a term in $\ddot{\theta}$ obtained in the form of the output voltage V in Fig. 1 of the present specification is converted into an A. C. voltage and added to an A. C. voltage corresponding to $v$ (i. e. to $\theta$). The same method—that of converting V into an A. C. voltage and adding it to an A. C. voltage measuring $\theta$ may be adopted when V is obtained as in Figs. 3, 4, 5 and 6. In this way a control voltage in $\theta$, $\dot{\theta}$ and $\ddot{\theta}$ may be built up which may be used to control the servo-motor as in Patent 2,088,654.

Alternatively the method employed in U. S. Patent 2,139,558 to F. L. Moseley, W. T. Cooke and C. A. Frische, filed August 29, 1935, for combining the $\theta$ term with the $\dot{\theta}$ and $\ddot{\theta}$ terms obtained in accordance with the present invention may be used. This method depends on the fact that the voltage $v$ is not a pure D. C. voltage but has, superimposed on it, a ripple at supply frequency, or rather at the frequency of the A. C. signal voltage from which $v$ is obtained by rectification; this ripple varies in magnitude and sense with $v$. The ripple is applied to the primary winding, or windings, of the transformer, or transformers, with the result that the output voltage V contains not only D. C. terms in $\dot{\theta}$ and $\ddot{\theta}$, but also an A. C. term in $\theta$. As described in Patent 2,139,558, such a combination can act, at least in the case of control of gas-discharge tubes, as a control term in $\theta$, $\dot{\theta}$, and $\ddot{\theta}$. In other words, we may use the voltage V derived in any of the ways described in the present specification as the complete control term for controlling grid controlled gas-discharge tubes, relying on the D. C. component of V to provide the terms in $\dot{\theta}$ and $\ddot{\theta}$ and on the A. C. ripple naturally present in it to provide the term in $\theta$. In order to control the relative magnitudes of these terms it may be necessary to provide a filter to reduce the amount of the A. C. ripple; one such filter is described in Patent 2,088,654. Other known forms of filter may be used, and they may be used in any appropriate part of the circuit: they may for example be used in the output circuit to filter the voltage V. We prefer however, to filter the voltage $v$ as this is maintained across a lower impedance.

An alternative method of obtaining a term in $\theta$ and combining it with the terms in $\dot{\theta}$ and $\ddot{\theta}$ is to obtain the term in $\theta$, like the other terms, in the form of a D. C. voltage. To do this the output circuit may be conductively coupled to the input circuit. One method of doing this is shown in Fig. 7. The circuit of this figure is similar to that of Fig. 6 except that the output circuit is made to include a small part of the resistance I. The total voltage V made up of $V_1$, $V_2$ and $V_3$ therefore differs from that of Fig. 6 by the inclusion of $V_3$, and this voltage is proportional to $v$, as it is tapped off resistance R as in a potentiometer. Since $v$ is proportional to $\theta$, the whole voltage V contains terms in $\theta$, $\dot{\theta}$, $\ddot{\theta}$.

Instead of tapping the voltage $V_3$ off R, i. e. using R as a potentiometer, it may be tapped off any other circuit connected across the voltage $v$. For example it might be tapped off either transformer primary circuit. In order to tap the correct voltage off the circuit through C and the upper transformer primary, it would be necessary to include another condenser in series in this circuit and include this condenser in the output circuit. The two condensers would then act as a potentiometer and the voltage thus introduced into the output circuit would be proportional to $v$.

Another method would be tap the voltage off the circuit through G. The conductive coupling impedance required in this case is a resistance. When the total control term is derived as a D. C. voltage as in any of the last mentioned examples, it may be used directly as a control for grid-controlled gas-discharge tubes using these in circuits of known type where they can be controlled by D. C. voltages. Alternatively the D. C voltage V may be converted into an A. C. voltage at supply frequency, as in Patent 2,088,654, to control gas discharge tubes by phase variation. In this last case the signal voltage from which the voltage $v$ is derived, for example in the manner shown in Patent 2,088,654, may be at any frequency whatever, and need have no relation to the frequency of the A. C. supplying the gas-discharge tubes. We find that this is a considerable advantage as we are thereby able to employ for the signal frequency a frequency much higher than normal supply frequencies. This is of great assistance in enabling the A. C. ripple to be filtered out of the voltage $v$ without the filter affecting the more rapid of the variations of $v$ obtained due to variations of $\theta$.

Figs. 1 to 7 show methods of deriving a voltave V in accordance with our invention, but the circuits in which this voltage is obtained are not convenient for many applications. In both the co-pending Patent 2,088,654 and Patent 2,139,558, the output voltage V is required to operate the grids of a pair of electron, or gas-discharge tubes in opposite senses, and the circuit in which V makes its appearance must therefore be balanced relative to earth.

Figure 8:
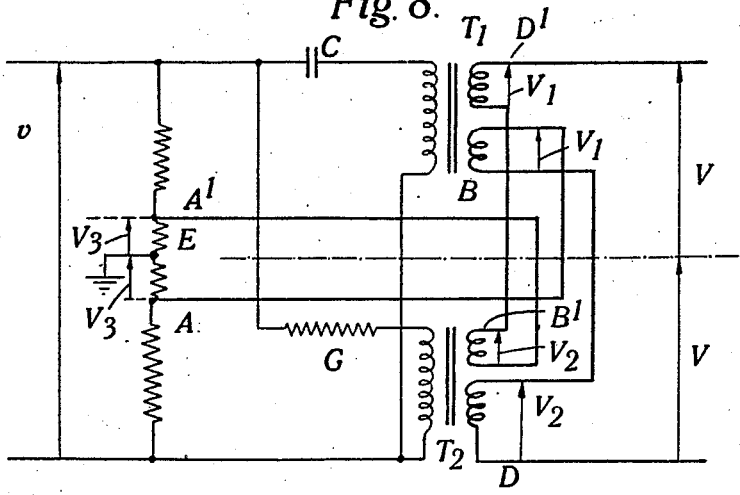
Figure 8 shows a modification of the circuit illustrated in Figure 7.

In Fig. 8, we show how the circuit of Fig. 7 can be modified to obtain complete symmetry with respect to earth. Fig. 7 is the most complex circuit shown, and the methods of adapting the principles of Fig. 8 to circuits other than that of Fig. 7 should be obvious.

In this figure the resistance $R_1$ is symmetrical with respect to the centre point E which is earthed, and the portion $AA^1$ tapped off to form the conductive coupling is also symmetrical about E. Each of the two transformers of Fig. 7 is replaced by a transformer having two separate equal secondary windings. Thus the transformer $T_1$ fed through C has two windings each generating a voltage $V_1$, and the transformer $T_2$ fed through G has two secondary windings each generating a voltage $V_2$. The output of the whole arrangement is taken from $DD^1$. Starting from E it is clear that the path $EA^1B^1D^1$ that must be taken to reach $D^1$ includes $V_3$ the voltage between E and $A^1$; $V_2$, the voltage between $A^1$ and $B^1$ due to one secondary winding of transformer $T_2$; and $V_1$ the voltage between $B^1$ and $D^1$ due to one secondary winding of transformer $T_1$. Similarly the path EABD between E and D includes voltages $V_3$, $V_2$ and $V_1$ in order, these voltages being in the opposite sense. Therefore if $D^1$ is at a voltage V, equal to $V_1+V_2+V_3$, above earth, D is at a voltage V below earth and complete symmetry with respect to earth is obtained, not only in voltages but in the circuit constants. It will be seen that the use of two transformers $T_1$ and $T_2$ fed through C and G respectively, is similar to the arrangement of Fig. 6 and it will be understood that the relative magnitudes and signs of the first and second derivative terms can be independently adjusted as noted in connection with the description of the circuit of that figure. Thus, by suitable primary and secondary transformer connections a voltage proportional to the difference of the two derivatives may be obtained and the ratio of the two components adjusted by varying C or G or both.

It will be understood that it is a general characteristic of all the forms of the invention that the second derivative term is obtained by two stages of differentiation, one stage being characterised by the differentiation of a voltage by means of a condenser so that the differential is obtained as a current, and the other stage being characterised by the differentiation of a current by means of a transformer or auto-transformer so that the differential is obtained as a voltage. In Figs. 1 to 8 the condenser stage of differentiation is used first and the transformer operates on the result; and this is actually the order we prefer. The order, however, may be reversed.

Figure 9:
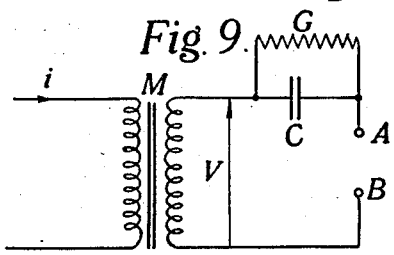

In Fig. 9 we show a circuit in which a current proportional to $\theta$ is differentiated by a transformer to provide an output voltage proportional to $\dot{\theta}$, which is subsequently differentiated by a condenser, to provide a current proportional to $\ddot{\theta}$. It is also shown how terms in $\dot{\theta}$ may be added to those in $\ddot{\theta}$ in this system. We suppose that a current $i$ into the primary winding of the transformer is maintained by means, not shown, such that this current is a measure of $\theta$. The means may, for example, be similar to those of Fig. 2, in which the required effect is obtained. As in Fig. 2, the output voltage V of the secondary winding is $-MDi$.

Between A and B is connected the load circuit of the device, which should be of impedance considerably less than that of the combination shown of condenser C and conductance G. It follows, exactly as in Fig. 3, that the current passed by the combination is $CDV+GV$. Consequently the current passed into the load is $$-MCD^2i-MGDi$$

In Patents Nos. 2,088,654 and 2,139,558, the devices controlling the servo-motor comprise grid-controlled gas discharge tubes which are operated by voltage and not by current. Consequently if the arrangement of Fig. 9 is to be adapted to such control systems, it is necessary to convert the current supplied to AB into a voltage, though this would not be necessary in systems controlling in accordance with input current. To convert the current supplied to AB into a voltage, it is sufficient to make AB a resistance. The voltage developed across AB may then be used to control the grids of grid-controlled gas-discharge tubes. The actual circuit of Fig. 9 would not be used, but one which was symmetrical with respect to earth so that it could operate the grids of two tubes in push-pull.

Such a system is shown in Fig. 10. In this figure there is shown the method of obtaining the current $i$ proportional to $\theta$ for feeding the transformer primary. This is similar to the method of Fig. 2. The whole circuit is symmetrical with respect to the earth point E and it can be seen that the secondary circuits of the two halves of transformer $T_1$ are each the same as in Fig. 9.

Fig. 10 also includes the extra transformer $T_2$, the primary winding of which is supplied from a source of A. C. shown as a generator X. The secondary winding $BB^1$ is centre-tapped at E. This transformer serves to provide equal and opposite A. C. voltages to B and $B^1$ and therefore to the points $G_1$ and $G_2$. $G_1$ and $G_2$ would be connected to the grids of grid-controlled gas discharge tubes (possibly through amplifying valves) for controlling the servo-motor of the system. Clearly therefore the grids of these discharge tubes are supplied in anti-phase with A. C. voltages from source X and with D. C. voltages proportional to $\dot{\theta}$ and $\ddot{\theta}$. A ripple voltage proportional to $\theta$ will also reach grids $G_1$ and $G'$ in anti-phase as already explained.

The purpose of the A. C. voltage from source X is to act as a bias to bring the gas-discharge tubes to a suitable point of their characteristics in known manner.

Fig. 10 shows how this voltage may be included in circuits of the type embodying our invention. The same principle may be applied to the other circuits illustrated, except that in circuits such as that of Fig. 8 where conductive coupling is employed, it would be advisable to have two separate secondary windings for transformer T₂.

Fig. 11 illustrates the manner in which the differentiating circuits of Fig. 3 may be connected in a positional control system of the type disclosed in Patent No. 2,088,654. Minor circuit details which will readily be supplied by one skilled in the art have been omitted for the sake of simplicity, detailed circuits other than the differentiating circuits of the present invention being disclosed in the aforesaid patent.

It will be seen that an A. C. signal proportional to the relative displacement of a controlling object (handwheel) 11 and controlled object 12 is generated in winding 18 of a Selsyn signal generator 14 when handwheel 11 is turned and is supplied to a thermionic tube circuit which converts the A. C. signal, which is of reversible phase as is well known, into reversible polarity direct current, this current being filtered by low pass filter 19, as described in the aforesaid patent. Shunt resistance 1, capacitance C, conductance G and transformer 2 correspond to the elements shown in Fig. 3 of the present application, the output of this part of the circuit as previously described including terms proportional to the relative displacement or unbalance and to its first and second time derivatives. This output is passed on to the motor control circuit for effecting the rebalancing of the network by causing motor 20 to drive winding 11 of Selsyn receiver 14 into a position of angular agreement with winding 16 of transmitter 13 and simultaneously bring controlled object 12 into angular agreement with handwheel 11.

What is claimed is:

1. A position control system having a controlling object, a controlled object, driving means to bring said controlled object into a predetermined angular relationship with said controlling object, means for generating a signal E. M. F. proportional to the departure from said relationship, a control circuit for said driving means adapted to receive said E. M. F. and comprising two parallel branches including respectively electrostatic and electromagnetic means serially connected and resistive and electromagnetic means serially connected for separately generating two time derivatives of said E. M. F., and means for combining said two derivatives and a fraction of said applied E. M. F. and delivering said combined three component E. M. F. to said driving means.

2. In a position control system having a controlling object, a controlled object and means for driving said controlled object to bring it into a predetermined angular relationship with said controlling object, a control circuit for receiving an input E. M. F. proportional to the angular displacement between said controlling and controlled objects, electrostatic means therein for generating a time derivative of said input E M. F., electromagnetic means therein having mutual inductance for generating another time derivative of said input E. M. F., said electrostatic and electromagnetic means being sequentially interchangeable in said circuit, means for combining said time derivatives of said E. M. F. in predetermined proportions and adding thereto a fraction of said input E. M. F., and means for controlling said controlled object driving means in response to the combined three component E. M. F. delivered by said control circuit.

3. A position control system including a controlling object, a controlled object, means for driving said controlled object to bring it into a predetermined angular relationship with said controlling object and a control circuit for said driving means including means for producing an output voltage which is proportional to a control term defined as the combination of the relative angular displacement of the controlling and controlled objects with the first and second time derivatives of said angular displacement, said second derivative being obtained by two stages of differentiation, one stage being characterized by the differentiation of a voltage by means of a condenser, the resulting derivative appearing as a current and the other stage being characterized by the differentiation of a current by means of a transformer, the resultant derivative appearing as a voltage.

4. A position control system including a controlling object, a controlled object, means for driving said controlled object to bring it into a predetermined angular relationship with said controlling object and a control circuit for said driving means including means for producing an output voltage which is proportional to a control term defined as the combination of the relative angular displacement of the controlling and controlled objects with the first and second time derivatives of said angular displacement, the means for differentiating said angular displacement term including a condenser and a conductance in parallel and a transformer, the combined impedance of the condenser and the conductance in parallel being high relative to that of the primary winding of the transformer.

5. A position control system including a controlling object, a controlled object, means for driving said controlled object to bring it into a predetermined angular relationship with said controlling object and a control circuit for said driving means including means for producing an output voltage which is proportional to a control term defined as the combination of the relative angular displacement of the controlling and controlled objects with the first and second time derivatives of said angular displacement, said control circuit having a relatively high impedance consisting of a resistance and a capacitance in parallel with each other and a transformer primary of relatively low impedance in series with said parallel circuit.

6. A position control system including a controlling object, a controlled object, means for driving said controlled object to bring it into a predetermined angular relationship with said controlling object and a control circuit for said driving means including means for producing an output voltage which is proportional to a control term defined as the combination of the relative angular displacement of the controlling and controlled objects with the first and second time derivatives of said annular displacement, said control circuit including a resistance condenser network and a transformer for obtaining said two time derivatives of the displacement signal.

7. In a position control system having a controlling object, a controlled object and means for driving said controlled object to bring it into a predetermined angular relationship with said controlling object, means for generating an E. M. F. proportional to departure from said relationship, a circuit adapted to receive said E M. F. and including coacting electrostatic and electromagnetic means for generating the first and second time derivatives of said E. M. F., means for combining said derivatives in opposite sense and adding thereto a fraction of said received E M. F., and means for controlling said driving means in accordance with said composite E. M. F.

8. A normally balanced electrical network, variable means for unbalancing said network, and means responsive to a function of the unbalance produced thereby for rebalancing said network including means for producing a voltage proportional to the unbalance and to its first and second time derivatives, said voltage producing means including a capacitance and a conductance connected in parallel and a transformer having a winding connected to said parallel circuit, the impedance of said parallel circuit being high relative to the impedance of said winding.

9. A normally balanced electrical network, variable means for unbalancing said network, and means responsive to the unbalance produced thereby for rebalancing said network including a circuit for producing a rebalancing control E. M. F. having components proportional to said unbalance and to its first and second time derivatives, said circuit comprising a shunt resistance, a pair of shunt impedances, one of said impedances including a resistance and the other of said impedances including a capacitance, and a pair of transformers having the same number of output windings, the input impedance of one of said transformers forming a part of said first shunt impedance and having a value low in comparison with the value of said resistance and the input impedance of said other transformer forming a part of said other shunt impedance and having a value low in comparison with the reactance of said capacitance, the output windings of said two transformers being connected in a series circuit including a portion of said first shunt resistance, said windings being symmetrically disposed with respect to said resistance, and the windings of the two transformers being connected to supply opposing E. M. F.s to said series circuit.

10. A normally balanced electrical network, variable means for unbalancing said network, means responsive to the unbalance produced thereby for rebalancing said network including a circuit for producing a rebalancing control E. M. F. having components proportional to said unbalance and to its first and second time derivatives, said circuit comprising a first transformer having an input winding and a pair of output windings, a second transformer having an input winding and an output winding, the output winding of said second transformer being connected in series between inner terminals of the two output windings of said first transformer, a pair of symmetrically disposed series impedances connected to outer terminals of said first transformer output windings, said series impedances including resistance and capacitance, a pair of resistances each shunting a combination of first transformer output winding and series impedance, and means for energizing the input winding of said second transformer from an A. C. source.

HARVARD L. HULL.